UNITED STATES PATENT OFFICE.

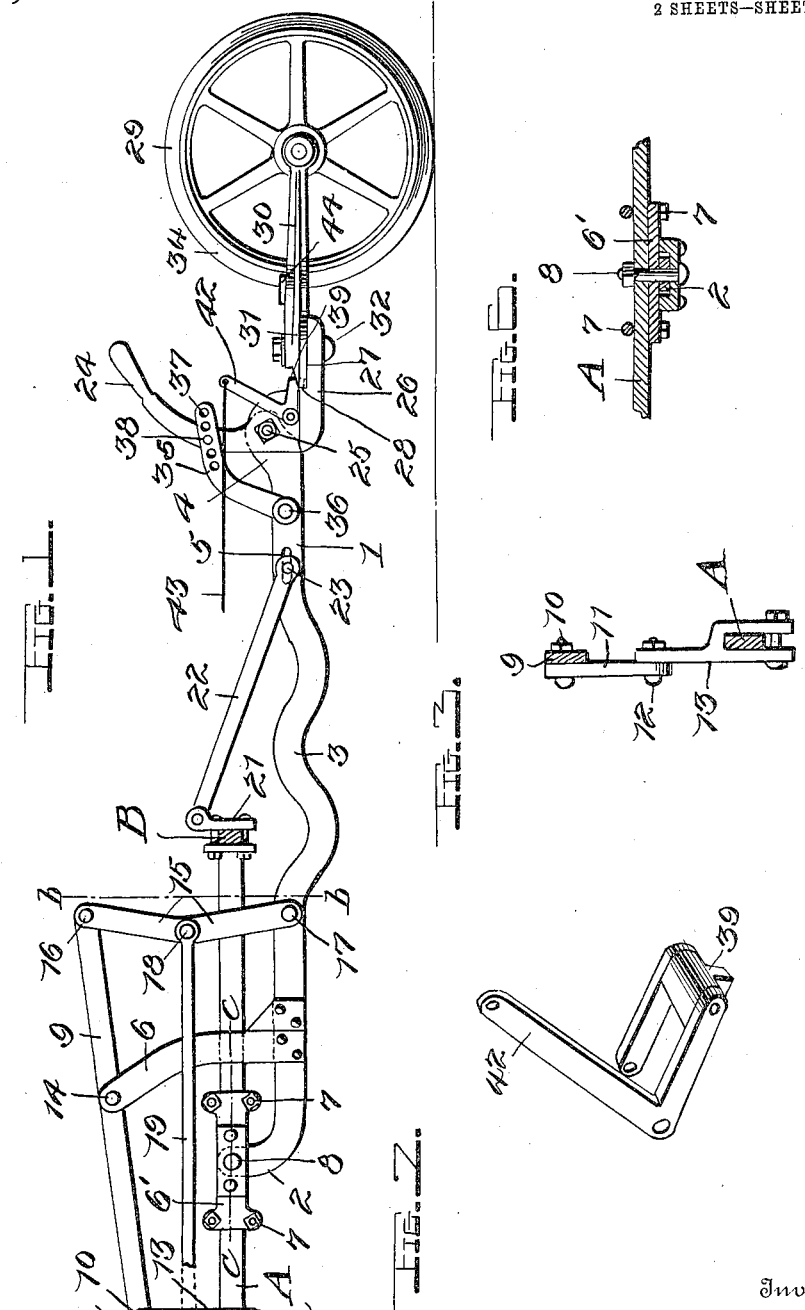

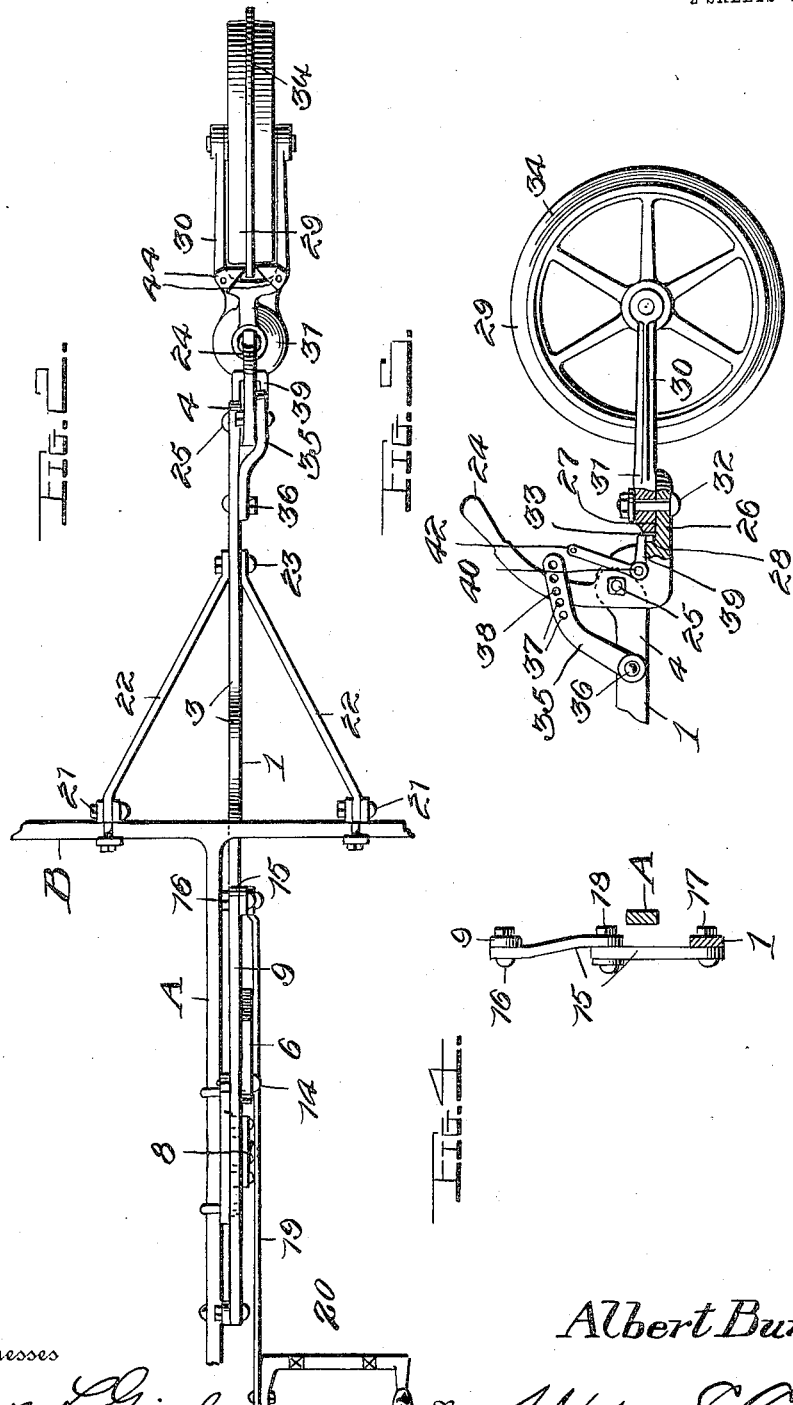

ALBERT BURGER, OF WATKINS, MINNESOTA.

BINDER-TRUCK.

1,036,444.  Specification of Letters Patent.  Patented Aug. 20, 1912.

Application filed August 7, 1911. Serial No. 642,599.

*To all whom it may concern:*

Be it known that I, ALBERT BURGER, a citizen of the United States, residing at Watkins, in the county of Meeker and State of Minnesota, have invented certain new and useful Improvements in Binder-Trucks, of which the following is a specification, reference being had to the accompanying drawings.

This invention is an improved binder truck for use in connection with a self binding harvest machine to operate behind the same and prevent the frame of the machine from becoming unbalanced when going up or descending a hill, and also to prevent side draft, and to prevent the weight of the binder from bearing on the pole and thereby relieve the horses of the weight of the binder, the object of the invention being to provide an improved truck of this character which may be readily attached to any form of self binding harvest machine and which may be adjusted as may be required by varying conditions.

The invention consists in the construction, combination and arrangement of devices hereinafter described and claimed.

In the accompanying drawings: Figure 1 is a side elevation of a binder truck constructed in accordance with my invention, showing the same attached to a self-binding harvester; Fig. 2 is a plan of the same; Fig. 3 is a detail vertical sectional view of the same on the plane indicated by the line $a$—$a$ of Fig. 1; Fig. 4 is a similar view on the plane indicated by the line $b$—$b$ of Fig. 1; Fig. 5 is a detail elevation, partly in section, showing the rear portion of the beam, the lower portion of the lever which raises and lowers the beam and also showing the fork and the trailing rear supporting wheel; Fig. 6 is a detail sectional view on the plane indicated by the line $c$—$c$ of Fig. 1, and Fig. 7 is a detail perspective view of a forked locking device hereinafter specifically referred to.

In accordance with my invention I provide a beam 1 of suitable length which is provided with an up-turned vertical arm 2 at its front end to bear against one longitudinal side of a bar A of a harvester frame. The beam is here shown as provided with bends 3 and its rear end is broadened vertically and rounded as at 4. At a suitable distance from the rear end of the beam is a slot 5. An arm 6 extends upwardly and curves forwardly from the beam 1, the said arm having its lower end secured to the beam at a suitable distance from the front end of the latter. A clip plate 6' is secured to the said side of the harvester frame by means of bolts 7 and bears against the outer side of the upper portion of the arm 2, the latter being pivotally connected to the bar A of the harvester frame by means of a bolt 8 which is formed with the said clip plate, so that the beam is pivotally connected at its front end to the harvester frame for angular movement in a vertical plane, the said beam extending rearwardly from the harvester frame.

A lever bar 9, which is disposed above the beam has its front end pivotally connected by a bolt 10 to the upper end of a link 11, the lower end of said link being pivotally connected, by a bolt 12, to a clip 13, which clip is secured to the bar A. The upper end of the arm 6, which bears against one side of the lever bar 9, at a point midway between the ends of the lever bar, is pivotally connected to the lever bar by a bolt 14. A pair of toggle links 15 are pivotally connected at their upper and lower ends to the lever bar and beam 1, respectively, in the rear of the supporting arm or standard 6 by bolts 16 and 17 and are pivotally connected together by a bolt 18, the latter bolt also pivotally connecting the rear end of a rod 19 to the toggle links, said rod extending forwardly and being connected to a suitable operating lever 20. The beam 1 is also connected, near its rear end, to a transverse bar B of the harvester frame by means of a pair of clips 21 which are secured on said bar and a pair of brace rods 22, the front ends of which are hooked or otherwise loosely connected to eyes formed on said clips, and the rear ends of which brace rods bear on opposite sides of the beam 1 and are pivotally connected thereto by a bolt 23 which passes through and is slidable in the slot 5.

An adjusting lever 24 is pivotally connected by a bolt 25 to the broadened rear portion 4 of the beam 1 so that the said adjusting lever is adapted to be turned in a vertical plane on the rear end of the beam. The said adjusting lever is provided, at its lower end, with a rearwardly extending bracket arm 26 which presents a broadened horizontal upper surface, the rear end of the said bracket arm being substantially circular and the said bracket arm being provided, on its upper side, at its rear end, with a circular recess 27, a segmental shoulder 28 being formed at the front side of the said recess. A trailing rear supporting wheel 29 is mounted in a fork 30. The said fork is provided, at its front end, with a circular head 31 which bears on the rear end of the bracket arm 23, fits in the recess 27 and is pivotally connected to the said bracket arm by a vertical bolt 32. Hence the wheel 29, with its fork 30, is adapted to swing or turn laterally to either side of the beam 1 and may also be adjusted in line with the said beam 1. The head 31 of the fork has a locking notch 33 in the center of its front side. The wheel 29 has a centrally disposed peripheral flange 34 which embeds in the earth and prevents the wheel from slipping laterally thereon.

A link 35 is pivotally connected at its lower end, as at 36, to the beam 1 and is provided at its rear end with a series of adjusting openings 37, any one of which may be engaged by a stud 38 which projects from one side of the lever arm 24. Hence the angular position of the lever arm 24, bracket arm 26 and wheel fork 30 with respect to the beam 1, may be varied as may be required. A locking dog 39 to engage the notch 33 of the fork head and lock the fork, together with the wheel 29, in alined position with respect to the beam 1, is pivotally mounted, as at 40, on one side of the lever 24 and is provided with an upwardly extending arm 42 to which a suitable operating cord 43 may be attached. This cord may extend to within convenient reach of the driver so that the driver can, at will, disengage the locking dog from the notch 33 whenever it is desirable to unlock the fork and permit the fork and the wheel 29 to swing or turn laterally as may be required when turning the machine.

Since the beam extends rearwardly from one side of the machine frame the wheel 29, when its fork is locked in alined position with respect to the beam 1, serves to prevent side draft. The truck with its vertically adjustable trailing wheel serves to support the rear end of the frame of the harvester machine to prevent the same from becoming overbalanced when moving up or down a hill. The lever 20, together with the toggle links 15, lever bar 9 and arm or standard 6, enables the beam 1 to be adjusted vertically as may be required to cause the truck to support the rear side of the harvester frame and prevent the latter from becoming overbalanced.

It will be understood that my improved truck, which is connected to and which trails after the binder, enables the binder to be tilted as may be required without interfering with the binder pole where the horses are hitched, and that my improved truck relieves the pole and the horses of all of the weight of the binder, thus greatly reducing the labor of the horses.

In Fig. 2 of the drawings, I show the arms of the fork 30 provided with scrapers 44 which operate on the periphery of the wheel 29, on opposite sides of the flange 34 thereof and prevent the earth from adhering to the wheel.

Having thus described my invention I claim:

1. A binder truck comprising a wheel supported element, means for connecting the front end of said element to a binder frame for vertical angular movement of said element, a lever bar pivotally connected to said element, means for pivotally connecting the front end of the lever bar to the binder frame, and adjusting means for the said element and including toggle links connecting the element and the lever bar.

2. A binder truck, including a beam, means for connecting the front end of the beam to a binder frame for the vertical angular movement of said beam, means for holding said beam in different positions in its vertical angular movement relative to the frame, a lever connected to the rear end of the beam for vertical angular movement thereon and having a rearwardly extending arm, a rear trailing supporting wheel, a fork in which the wheel is mounted, said fork being connected to the arm of the lever for angular movement in a horizontal plane, and means for rigidly connecting the fork to said arm as against said movement.

3. A binder truck, including a beam, means for connecting the front end of the beam to a binder frame, a lever connected to the rear end of said beam for vertical angular movement thereon and having a rearwardly extending arm, means connected to said lever and the beam for holding the lever in different adjusted positions, a rear trailing supporting wheel, a fork in which the wheel is mounted, said fork being pivotally connected to the arm of the lever for movement in a relative horizontal plane, said fork being provided with a locking notch, a latch carried by said arm and adapted to enter said notch to hold the fork from moving laterally, and means connected to said latch and extending forwardly therefrom for releasing the latch from said notch.

4. A binder truck, comprising a beam, means for connecting the front end of the beam to a binder frame for vertical angular movement, a lever connected to the rear end of the beam for vertical angular movement thereon and having a rearwardly extending arm, a rear trailing supporting wheel, a fork in which the wheel is mounted, said fork being connected to the arm of the lever for laterally swinging movement relative thereto, means for holding said fork from such movement, and a link connected to said beam and formed at one end with a plurality of apertures, the lever being provided with a stud designed for engagement in any of said apertures, whereby to hold the lever in different vertically adjusted positions.

5. The combination with a frame of the character described, of a binder truck, including a wheel supported beam, means for connecting the front end of said beam to the frame for the vertical angular movement of the beam, a standard connected to and extending upwardly from said beam, a lever bar fulcrumed intermediate of its ends on said standard and pivotally connected at one end to the frame, toggle links connecting the other end of said lever to the beam, and means for operating said links.

6. The combination with a frame of the character described, of a binder truck, including a wheel supported beam, means for connecting the front end of said beam to the frame for the vertical angular movement of the beam, a standard connected to and extending upwardly from said beam, a lever bar fulcrumed intermediate of its ends on said standard and pivotally connected at one end to the frame, toggle links connecting the other end of said lever to the beam, and an actuating lever operatively connected to said links for operating the latter.

In testimony whereof I hereunto affix my signature in the presence of two witnesses.

ALBERT BURGER.

Witnesses:
E. ENDERLY,
T. E. DILLON.

---

Copies of this patent may be obtained for five cents each, by addressing the "Commissioner of Patents, Washington, D. C."